United States Patent [19]

Schlieckmann et al.

[11] 4,056,122
[45] Nov. 1, 1977

[54] FLUID COMPONENT RECYCLING SYSTEM IN A PLURAL COMPONENT PLASTICS MOLDING MACHINE

[75] Inventors: Alfred Schlieckmann, Lindau; Kurt Moser, Kirchheim, both of Germany

[73] Assignee: The Upjohn Company, Kalamazoo, Mich.

[21] Appl. No.: 656,164

[22] Filed: Feb. 9, 1976

[30] Foreign Application Priority Data

Feb. 21, 1975 Germany .............................. 2507580

[51] Int. Cl.² .............................................. B29B 5/04
[52] U.S. Cl. ..................................... 137/563; 137/116
[58] Field of Search ........................ 137/563, 599, 116

[56] References Cited

U.S. PATENT DOCUMENTS

| 2,679,207 | 5/1954 | Mategorin | 137/599 X |
| 3,784,169 | 1/1974 | Bockmann et al. | 137/563 X |
| 3,788,337 | 1/1974 | Breer | 137/563 X |
| 3,924,651 | 12/1975 | Hippel et al. | 137/563 X |

FOREIGN PATENT DOCUMENTS

1,372,435   10/1974   United Kingdom ................. 137/563

Primary Examiner—William R. Cline
Attorney, Agent, or Firm—St.Onge, Mayers, Steward & Reens

[57] ABSTRACT

A system is disclosed for a plural component plastics reaction injection molding machine which provides continuous supply and recycling of each of a plurality of liquid components between a mixing head and separate supply tanks for the respective liquid components. The system is designed to use a portion of the respective recycle conduits of the several components as supply conduits to the head, in parallel with the normal supply conduit to the head, during periods of reaction injection taking place in the mixing head, whereby to permit the employment of smaller diameter conduits in the aforesaid portions of the system without reducing the capacity of the molding system. Further economy is achieved by design of the aforesaid portions of the conduit systems to dispose either the supply or recycle conduit concentrically within the other.

6 Claims, 1 Drawing Figure

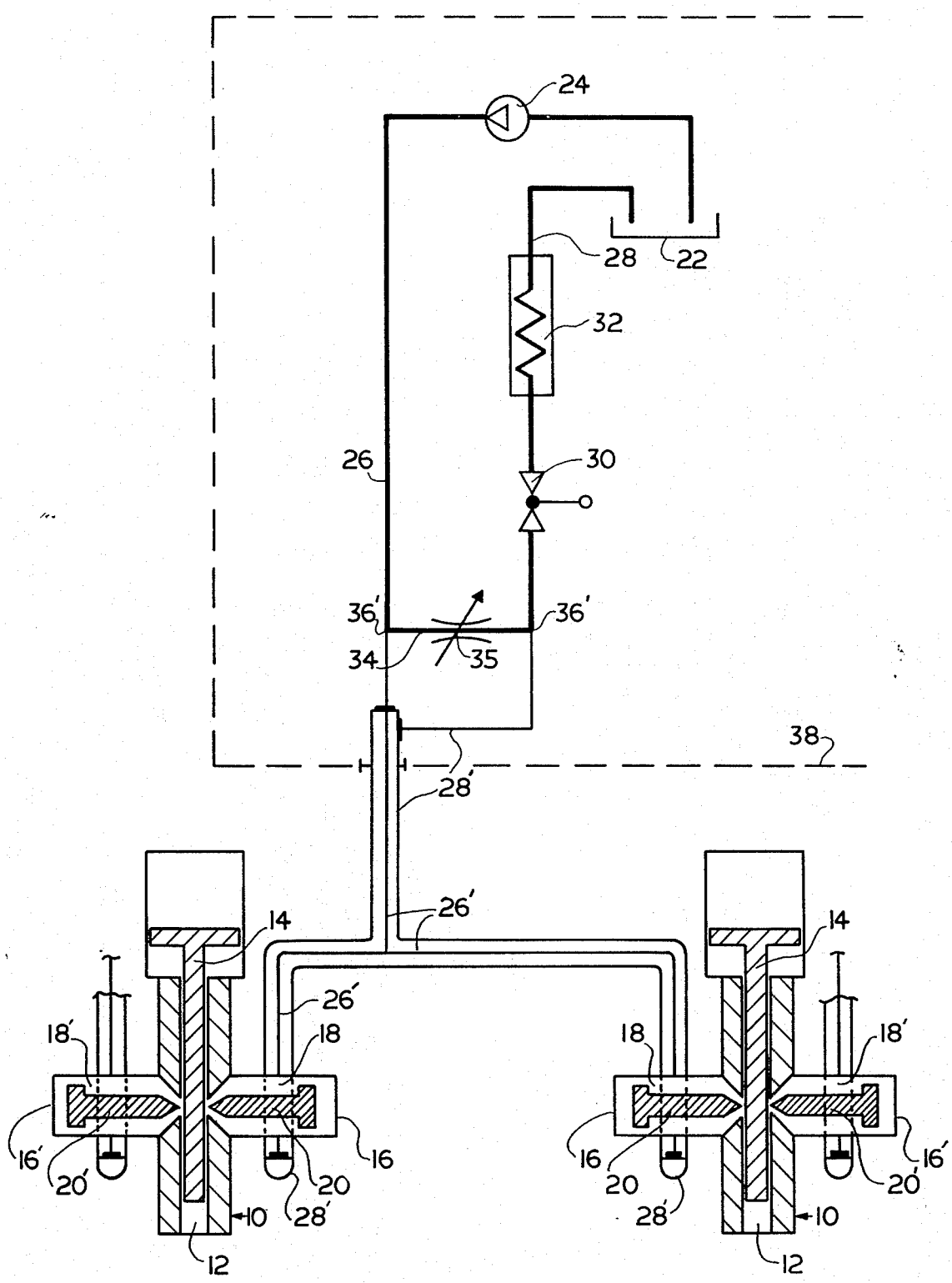

FLUID COMPONENT RECYCLING SYSTEM IN A PLURAL COMPONENT PLASTICS MOLDING MACHINE

BACKGROUND OF THE INVENTION

1. FIELD OF THE INVENTION

The invention relates to reaction injection molding of polymeric materials and more particularly to a system for supplying a mixing head of such a system with a plurality of liquid components which are maintained in separate circulatory paths until mixed together at the mixing head and injection into a suitable mold. The invention pertains specifically to the design of the circulatory system wherein a portion of the recycling conduits of the several liquid components are used intermittently as supply conduits operating in parallel flow with the normal supply conduits of the system.

2. Description of the Prior Art

An example, for which the invention is particularly suitable, is the so-called reaction foam casting method. In the case of this method two or more fluid plastics components are supplied to a mixing head, where they are mixed and injected into the casting mold. In order to supply the plastics components only during the times of injection to the mixing head, the usually adopted practice up till now has been that of providing one inlet valve at the mixing head for each respective component, and this valve is opened during the injection times and is closed in the pauses or intervals. The fluid plastics component is passed by a pump from a feed container via a supply line to this inlet valve. In order to make possible circulation of the plastics component during the pauses, the inlet valve is furthermore connected with a return line, which returns to this feed container. During the pauses the inlet valve closes the opening, connecting these lines with the space to be charged, in this case the mixing chamber of the mixing head, and only the connection between the supply and return lines remains open so that the plastics material in this line system can circulate back to the feed container. During the injection periods the inlet valve is opened so that a connection between the supply and return lines or ducts on the one hand and the mixing chamber to be charged with the plastics material is afforded. Furthermore a stop cock located in the return line is closed which interrupts the circulation so that by means of the conveying pump a pressure can be built up in the supply line and this pressure forces the plastics material through the inlet valve into the mixing chamber of the mixing head.

The disadvantage of this prior art supply device resides in that the whole flow of plastics material must be propelled also in intervals between the individual injection periods via the inlet valve of the mixing head. Owing to the substantial viscosity of the plastics material this leads to a substantial heating of the material which makes necessary the provision of additional cooling means in the line or duct system. In order to keep down the heating effect as far as possible the line cross-sections, the cross-sections of the supply lines to the mixing head and the passage cross-sections in the mixing head must be made large, something which makes all dimensions as a whole large. The expense of the equipment is thus not only substantial, but the large duct lines make the mixing head difficult to handle.

SUMMARY OF THE INVENTION

The aim of the invention is that of avoiding these disadvantages and creating a device for the supply under pressure of fluid components which, even in the case of materials with a relatively high viscosity makes do with supply and return lines of comparatively small cross-sections in much of the system, without an excessive heating of the material occurring as a result.

This aim is achieved in a device of the initially mentioned type in accordance with the invention by the use of a bypass line which, shunting of bridging over the inlet valve, connects the supply line with the return line at a point close up to the component storage and pumping equipment.

Since the bypass line provided in accordance with the invention shunts the inlet valve of the mixing head, only a fraction of the material is forced to flow during circulation via the mixing head, while the remaining quantity of the material flows through this bypass line. The bypass line therefore acts like an additional enlargement of the passage crosssection of the mixing head so that the heating up of the plastics material is reduced. During the injection periods the stop cock, which is located downstream from the junction of the bypass line with the return line, is closed and as a result the plastics material is forced to flow both through the supply line and also via the bypass line through the return line to the inlet valve into the mixing chamber of the mixing head. Since during the times of injection both the supply line and also the return line serve for supply of the material to the inlet valve, during these times of injection the cross-sections of these two lines are summated for the supply of materials.

Conveniently the cross-section of the supply and the return lines between the points of branching of the bypass line and the inlet valve are made smaller than the cross-sections of these lines between the points of branching and the feed container and also the cross-section of the bypass line. When the inlet valve is closed and the stop cock is open during normal circulation (no mixing or injection), the quantities flowing through the respective lines are branched off or divided to flow via the inlet valve of the mixing head and via the bypass line in accordance with the resistances to flow to these lines. Thus, in accordance with the invention it is possible to ensure that during the circulation phase only a small quantity of material is forced to flow via the mixing head. This quantity of material can be adjusted by suitable selection of the cross-sections. An additional adjustability of the cross-sectional factors can be achieved during operation also by adopting the feature that the bypass line is provided with an adjustable choke. The greatest part of the quantity of material circulates via the bypass line with the greater cross-section and is therefore only heated to an insubstantial extent. The cooling means in the circulation system can therefore be made substantially smaller, something which makes the installation cheaper and reduces its dimensions. Furthermore, since the connections to the mixing head and the flow cross-sections in the mixing head are decreased, the whole mixing head becomes smaller and its manipulation becomes simpler.

In accordance with a further, particularly advantageous form of the invention the supply line and the return line are constructed as coaxially telescoped flexible tubes between the points of branching off and the bypass line and the inlet valve. This affords the advantage that only one line for each fluid component leads to the mixing head, something which both improves the appearance of the device and also simplifies operation. A substantial advantage afforded by this arrangement arises from the fact that the inner hose of the two telescoping hoses is surrounded during periods of injection by the material under pressure in the outer hose or flexible tube so that this inner hose is only loaded isostatically and despite the pressure of the plastics material, can be constructed as a low pressure hose or flexible tube.

Conveniently, the bypass line is located inside the machine housing, which is desirably located somewhat remotely from the inlet valve and the mixing head. This housing accomodates the conveying pump, the feed container, heat exchanger and other necessary means. The mixing head is connected only by the supply and the return lines, with the machine housing so that the manipulation of the mixing head is particularly satisfactory especially if the supply and return lines are arranged concentrically of each other. Furthermore it is possible to connect several mixing heads charged in a parallel fashion with their respective inlet valves using a common bypass line.

BRIEF DESCRIPTION OF THE DRAWINGS

In what follows the invention will be described in more detail with reference to a specific embodiment and to the enclosed drawing, wherein the single FIGURE shows diagrammatically a system in accordance with the invention.

DETAILED DESCRIPTION OF THE PREFERRED EMBODIMENTS

In the embodiment of the invention shown the device is represented in the utilization of the invention the supply of two different fluid plastics components to the mixing head of an injection molding installation. As the system is here illustrated, two mixing heads 10, 10, are shown, and each is supplied with two liquid polymeric components which are separately supplied to and recycled from each head but which, under the appropriate control are adapted to be brought into mixing relation with each other within the head under certain conditions. For the sake of simplicity, the diagrammatic illustration shows only one component supply and recycle system, the other system being identical for the other component.

The mixing head 10 has a mixing chamber 12, in which a plunger 14 slides, and which forces the plastics mixture of the chamber into the injection mold (not shown) to which the head is adapted to be connected. The mixing chamber 12 is connected via openings with the valve chambers 18, 18' of two inlet valves 16, 16'. In the valve chambers 18, 18' a sliding piston 20, 20' is arranged, having a needle valve, which can close the connecting opening between the valve chamber and the mixing chamber.

As mentioned above, the system for the supply of the respective plastics components to these inlet valves 16, and 16' respectively is represented in the drawing only for the inlet valve 16, since the device for the other inlet valve 16' is constructed completely similarly.

This supply system comprises a feed container or reservoir 22, in which the plastics component is stored as a fluid of suitable viscosity to permit it to be pumped. From this supply or feed container 22 the plastics material is forced by a pump 24 via a supply line 26, 26' into the valve chamber 18 of the inlet valve 16. The inlet chamber 18 is furthermore connected with a return line 28', 28, which leads again back to the feed container 22. In this return line 28 there is a stop cock 30 and a heat exchanger 32, which in the present case is a cooling means in order to hold the circulating material at the prescribed temperature. So far the device is the same as conventional prior art devices.

Additionally the system also comprises a bypass line 34, which connects the supply line 26, 26' with the return line 28, 28'. The position 36 of branching the bypass line 34 from the supply line is located between the conveying pump 24 and the connection of the supply line with the inlet valve 16. The position 36' of branching of the bypass line 34 on the return line is located between the point of connection of the return line to the inlet valve and the stop cock 30. The cross-section of the supply line 26 upstream from the point of branching 36 of the bypass line, the cross-section of the bypass line 34 and the cross-section of the return line 28 downstream from the position 36' of branching are larger than the cross-sections of the supply line 26' downstream from the position 36 of branching and the return line 28' upstream from the position 36' of branching. Preferably these cross-sections are twice as large.

Furthermore a choke 35 is provided in the bypass line 34 with an adjustable passage cross-section. As a result it is possible to set the cross-sectional factors of the bypass line and of the supply and return lines to suit the operational conditions in an optimum manner. This adaptation can in particular be carried out during operation.

The system operates in the following manner:

In the pauses between the periods of injection the inlet valve 16 is closed so that no plastics material can pass from the valve chamber 18 into the mixing chamber 12.

Furthermore the stop cock 30 is opened. The plastics material is pumped from the feed container 22 by the pump 24 via the supply line 26. At the position 36 of branching the material flow divides, the larger fraction flowing back via the bypass line 34 and the return line 28 into the feed container 22. The smaller fraction flows via the supply line 26', the valve chamber 18, the return line 28' and the return line 28 to the supply or feed container 22. It is only this smaller fraction which is substantially heated owing to the smaller cross-sections of the flow ducts or conduits. The cooling means 32 in the return line 28 removes this quantity of heat which is produced.

During injection periods the inlet valve 16 is opened and the stop cock 30 is closed. Owing to the closed condition of the stop cock 30 return circulation of the plastics material via the return line 28 is prevented, and the plastics component is pumped by the pump 24 via the supply line 26 to the position 36 of branching. Thence the plastics component flows both via the supply line 26' and also via the bypass line 34 and the return line 28' to the valve chamber 18, whence it is forced by the pressure produced by the pump 24 into the mixing chamber 12. The cross-sections of the supply line 26' and of the return line 28' preferably amount to half the cross-section of the supply line 26 so that the overall cross-section for the supply of material to the inlet valve 16 remains unchanged.

The bypass line 34 is preferably arranged within the machine housing 38, which is indicated by broken lines and encompasses the pump 24, the feed container 22, the cooling means 32 the stop cock 30 and the other conventional means which are not shown. Therefore only the supply line 36' and the return line 28' lead from this machine housing 38 to the mixing head. As diagramatically illustrated, the portion of the supply line 26 down stream of junction 36 within the housing 38 and leading to the mixture head 10 is located coaxially within that portion of the return duct 28' which is located upstream of junction 36'. This arrangement not only reduces the number of fluid component lines leading to and from each of the mixing heads; it also makes it possible to utilize low-pressure hydraulic lines for the inner conduit since the pressures on opposite surfaces of this line will be closely in balance at all times. Although the supply line 26' is shown specifically as being located concentrically within the return duct 28', it is obvious that the reverse relationship could be employed.

The arrangement furthermore simplifies manifolding of two or more mixing heads to operate in parallel, as may be advantageous in large installations employing multiple station injection molding lines.

We claim:

1. In a system for supplying one of a plurality of fluids under pressure to a mixing head having a mixing chamber into which the fluids are injected to produce mixing thereof, a valve chamber associated with said head and an inlet valve in said valve chamber controlling admission of said one fluid from said valve chamber to said mixing chamber, a fluid reservoir for said one fluid, a supply line connecting said valve chamber to said reservoir, and pump means in said supply lines to deliver said fluid under pressure from said reservoir to said valve chamber, a return line connecting said valve chamber to said reservoir, and a stop cock in said return line, whereby fluid can be circulated by said pump from said reservoir through said supply line to said valve chamber and back through said return line to said reservoir when said stop cock is open; the improvement which comprises a by-pass line between said supply line and said return line in shunt connection with said inlet valve chamber, said by-pass line being located upstream of said stop cock;

said by-pass line affording resistance to flow therethrough and thereby causing division of fluid flow between said by-pass line and said valve chamber.

2. The system defined in claim 1, wherein the portions of the supply and return lines extending from the by-pass interconnections therewith to the mixing head are of smaller crosssection than the respective lines between said by-pass interconnections and said fluid reservoir.

3. The system as defined in claim 1, wherein an adjustable fluid choke is incorporated in said by-pass line.

4. The system defined in claim 1, wherein said supply and return lines between said by-pass interconnections therewith and said mixing head are arranged coaxially one within the other.

5. The system as defined in claim 4, wherein the inner line of said coaxially related fluid conduits is of low pressure wall construction.

6. The system as defined in claim 4, wherein said coaxially related supply and return lines form a manifold and two or more mixing heads are connected in parallel to said manifold.

* * * * *